United States Patent
Itoh et al.

(10) Patent No.: US 9,001,368 B2
(45) Date of Patent: Apr. 7, 2015

(54) IMAGE PROCESSING APPARATUS, OPERATION STANDARDIZATION METHOD, AND NON-TRANSITORY COMPUTER-READABLE RECORDING MEDIUM ENCODED WITH OPERATION STANDARDIZATION PROGRAM WITH AN APPLICATION PROGRAM THAT SUPPORTS BOTH A TOUCH PANEL CAPABLE OF DETECTING ONLY ONE POSITION AND A TOUCH PANEL CAPABLE OF DETECTING A PLURALITY OF POSITIONS SIMULTANEOUSLY

(71) Applicant: Konica Minolta, Inc., Chiyoda-ku (JP)

(72) Inventors: Ayumi Itoh, Takarazuka (JP); Masayuki Kawamoto, Amagasaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/018,806

(22) Filed: Sep. 5, 2013

(65) Prior Publication Data

US 2014/0078546 A1 Mar. 20, 2014

(30) Foreign Application Priority Data

Sep. 19, 2012 (JP) ................................. 2012-205622

(51) Int. Cl.
*G06F 3/12* (2006.01)
*H04N 1/00* (2006.01)
*G06F 3/0488* (2013.01)

(52) U.S. Cl.
CPC .......... *H04N 1/00392* (2013.01); *G06F 3/0488* (2013.01); *H04N 1/00411* (2013.01); *G06F 3/12* (2013.01); *G06F 3/04883* (2013.01); *H04N 2201/0094* (2013.01)

(58) Field of Classification Search
CPC .... G06F 3/017; G06F 3/0488; G06F 3/03547
USPC ........... 358/1.15; 345/156, 174; 715/863, 716
See application file for complete search history.

(56) References Cited

U.S. PATENT DOCUMENTS

| 2007/0177803 A1 | 8/2007 | Elias et al. |
| 2007/0177804 A1 | 8/2007 | Elias et al. |

(Continued)

FOREIGN PATENT DOCUMENTS

| EP | 2455847 A1 | 5/2012 |
| JP | 2008-312153 A | 12/2008 |

(Continued)

OTHER PUBLICATIONS

Extended European Search Report issued in corresponding European Patent Application No. 13184529.9. dated Sep. 8, 2014.

(Continued)

*Primary Examiner* — Jacky X Zheng
(74) *Attorney, Agent, or Firm* — Buchanan Ingersoll & Rooney PC

(57) ABSTRACT

An image processing apparatus includes a display portion, a touch panel, and a control portion. The control portion includes a touch event generating portion to output a touch event indicating a position detected by the touch panel, a gesture event determining portion to determine a gesture event on the basis of a set of touch events continuously output from the touch event generating portion, an application portion operable, when receiving process identification information, to perform a process corresponding to the process identification information, an association portion operable, at the stage when an application program is installed, to associate each of a plurality of types of processes determined by the application program with one of gesture events, a process specifying portion to specify the process associated with the gesture event determined, and an operation notification portion to output the process identification information of the specified process to the application portion.

12 Claims, 8 Drawing Sheets

(56) References Cited

U.S. PATENT DOCUMENTS

| | | |
|---|---|---|
| 2010/0146412 A1 | 6/2010 | Nagase |
| 2011/0157636 A1* | 6/2011 | Maeda .................. 358/1.15 |
| 2011/0235130 A1 | 9/2011 | Okada |
| 2012/0086662 A1 | 4/2012 | Ashikawa |
| 2012/0105893 A1 | 5/2012 | Ito |
| 2012/0131490 A1 | 5/2012 | Lin et al. |
| 2012/0206388 A1* | 8/2012 | Tsuboi et al. .............. 345/173 |

FOREIGN PATENT DOCUMENTS

| | | |
|---|---|---|
| JP | 2009-525538 A | 7/2009 |
| JP | 2010-134755 A | 6/2010 |
| JP | 2011-170603 A | 9/2011 |
| WO | 2010-143673 A1 | 12/2010 |
| WO | 2012050031 A1 | 4/2012 |

OTHER PUBLICATIONS

Office Action (Notice of Ground of Rejection) issued on Oct. 7, 2014, by the Japanese Patent Office in corresponding Japanese Patent Application No. 2012-205622, and an English Translation of the Office Action. (8 pages)

"Mac OS X Lion 'OMOTE' or 'URA', Chapter of operation, More convenient by mastering multi-touch gestures! Operation of mouse & track pad may be more convenient by free software", Mac 100% vol. 12, pp. 58-61. Shinyusha Co., Ltd. Japan, Oct. 4, 2011.

* cited by examiner

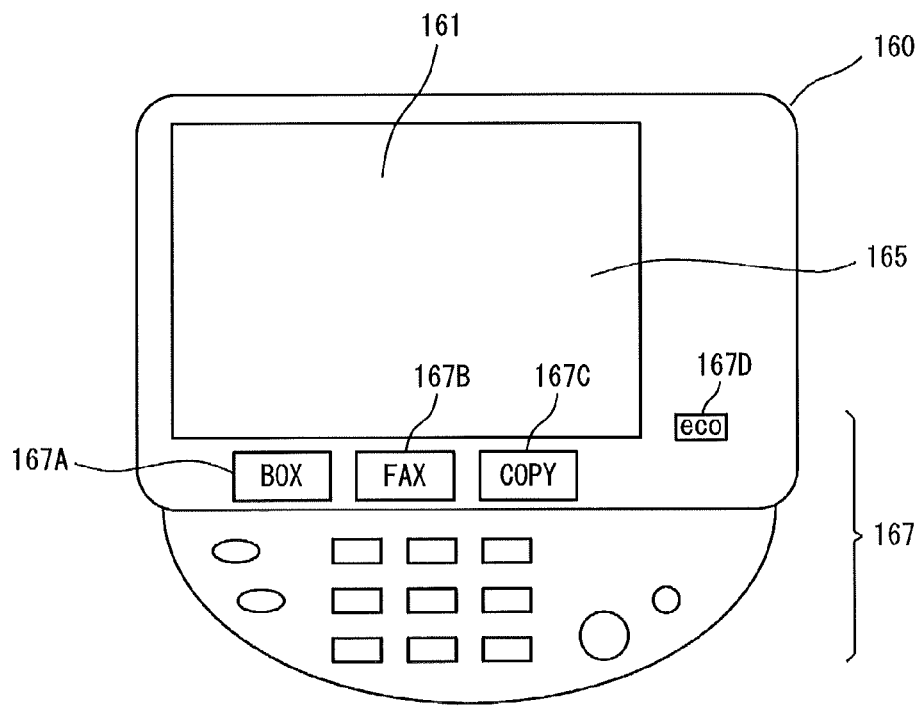
F I G. 2

FIG. 6

MASTER TABLE　　　　　　　　95

| PROCESS | GESTURE |
|---|---|
| SCROLL | FLICK |
| ENLARGEMENT | PINCH OUT |
| REDUCTION | PINCH IN |
| ROTATION | ROTATION |
| PAGE TURNING | SWIPE |

FIG. 7

FIRST CONVERSION TABLE　　　91

| PROCESS | GESTURE |
|---|---|
| SCROLL | FLICK |
| ENLARGEMENT | PINCH OUT |
| REDUCTION | PINCH IN |
| ROTATION | ROTATION |
| PAGE TURNING | SWIPE |

FIG. 8

SECOND CONVERSION TABLE　　　93

| PROCESS | GESTURE |
|---|---|
| SCROLL | FLICK |
| PAGE TURNING | SWIPE |

IMAGE PROCESSING APPARATUS, OPERATION STANDARDIZATION METHOD, AND NON-TRANSITORY COMPUTER-READABLE RECORDING MEDIUM ENCODED WITH OPERATION STANDARDIZATION PROGRAM WITH AN APPLICATION PROGRAM THAT SUPPORTS BOTH A TOUCH PANEL CAPABLE OF DETECTING ONLY ONE POSITION AND A TOUCH PANEL CAPABLE OF DETECTING A PLURALITY OF POSITIONS SIMULTANEOUSLY

This application is based on Japanese Patent Application No. 2012-205622 filed with Japan Patent Office on Sep. 19, 2012, the entire content of which is hereby incorporated by reference.

BACKGROUND OF THE INVENTION

1. Field of the Invention

The present invention relates to an image processing apparatus, an operation standardization method, and a non-transitory computer-readable recording medium encoded with an operation standardization program. More particularly, the present invention relates to an image processing apparatus into which an application program is installed, an operation standardization method performed by the image processing apparatus, and a non-transitory computer-readable recording medium encoded with an operation standardization program for causing a computer to perform the operation standardization method.

2. Description of the Related Art

Some recent image processing apparatuses, typified by multi-function peripherals (MFPs), allow application programs to be installed therein. A user can customize an MFP by installing therein an application program according to the type of usage. The application program may display a large screen. In such a case, a display panel included in the MFP can display only a part of the screen, and thus, the screen needs to be scrolled.

On the other hand, as a technique of accepting an operation of scrolling a screen, there is a technique of using a touch panel. For example, Japanese Patent Laid-Open No. 2011-170603 describes a mobile terminal which includes: a display portion for displaying data information, a touch input portion for performing an input by touching a point on the display portion; a contact detection portion for detecting at least one or more contact points which are input simultaneously, among the inputs performed in the touch input portion; an acquisition portion for acquiring the number of simultaneously input contact points that have been detected by the contact detection portion; and a processing portion configured to perform different processes depending on at least the number of contact points; wherein the processing portion is configured, when the contact detection portion detects that the at least one or more simultaneously input contact points have been moved in one direction, to move the data information being displayed on the display portion by an amount of movement that corresponds to the number of simultaneously input contact points acquired in the acquisition portion.

However, some touch panels are capable of detecting only one position, while other touch panels are capable of detecting a plurality of positions simultaneously, and MFPs may be provided with different types of touch panels. It would therefore be difficult to develop an application program that supports all types of touch panels.

SUMMARY OF THE INVENTION

An aspect of the present invention provides an image processing apparatus including a display portion to display an image, a touch panel capable of detecting one or more positions designated by a user on a display surface of the display portion, and a control portion to control the display portion and the touch panel, wherein the control portion includes: a touch event generating portion operable, in response to detection of one or more positions by the touch panel, to output touch event(s) each including positional information indicating the corresponding one of the one or more positions; a gesture event determining portion to determine one of a plurality of gesture events on the basis of a set of a plurality of touch events continuously output from the touch event generating portion; an application portion operable, in response to input of one of a plurality of pieces of process identification information for respectively identifying a plurality of types of processes determined by an application program, to perform one of the plurality of types of processes that corresponds to the input process identification information; an association portion operable, at the stage when the application program is installed, to associate each of the plurality of types of processes determined by the application program with one of the plurality of gesture events in correspondence with the application program; a process specifying portion to specify one of the plurality of types of processes that is associated by the association portion with the gesture event determined by the gesture event determining portion in correspondence with the application program; and an operation notification portion to output the process identification information of the specified process to the application portion.

Another aspect of the present invention provides an operation standardization method performed by a computer controlling an image processing apparatus, the image processing apparatus including a display portion to display an image, a touch panel capable of detecting one or more positions designated by a user on a display surface of the display portion, and an application portion operable, in the case where an application program is executed and one of a plurality of pieces of process identification information for respectively identifying a plurality of types of processes determined by the application program is input, to perform one of the plurality of types of processes that corresponds to the input process identification information, wherein the method includes: a touch event generating step of, in response to detection of one or more positions by the touch panel, outputting touch event(s) each including positional information indicating the corresponding one of the one or more positions; a gesture event determining step of, in the case where a plurality of touch events are continuously output in the touch event generating step, determining one of a plurality of gesture events on the basis of a set of the continuously output touch events; an association step of, at the stage when the application program is installed, associating each of the plurality of types of processes determined by the application program with one of the plurality of gesture events in correspondence with the application program; a process specifying step of specifying one of the plurality of types of processes that is associated in the association step, in correspondence with the application program, with the gesture event determined in the gesture event determining step; and an operation notification step of outputting the process identification information of the specified process to the application portion.

Yet another aspect of the present invention provides a non-transitory computer-readable recording medium encoded with an operation standardization program performed by a computer which controls an image processing apparatus, the image processing apparatus including a display portion to display an image, a touch panel capable of detecting one or more positions designated by a user on a display surface of the display portion, and an application portion operable, in the case where an application program is executed and one of a plurality of pieces of process identification information for respectively identifying a plurality of types of processes determined by the application program is input, to perform one of the plurality of types of processes that corresponds to the input process identification information, wherein the program causes the computer to perform: a touch event generating step of, in response to detection of one or more positions by the touch panel, outputting touch event(s) each including positional information indicating the corresponding one of the one or more positions; a gesture event determining step of, in the case where a plurality of touch events are continuously output in the touch event generating step, determining one of a plurality of gesture events on the basis of a set of the continuously output touch events; an association step of, at the stage when the application program is installed, associating each of the plurality of types of processes determined by the application program with one of the plurality of gesture events in correspondence with the application program; a process specifying step of specifying one of the plurality of types of processes that is associated in the association step, in correspondence with the application program, with the gesture event determined in the gesture event determining step; and an operation notification step of outputting the process identification information of the specified process to the application portion.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a plan view showing an example of an operation panel;

FIG. 6 shows an example of a master table;

FIG. 7 shows an example of a first conversion table;

FIG. 8 shows an example of a second conversion table;

DESCRIPTION OF THE PREFERRED EMBODIMENTS

Figure 1:
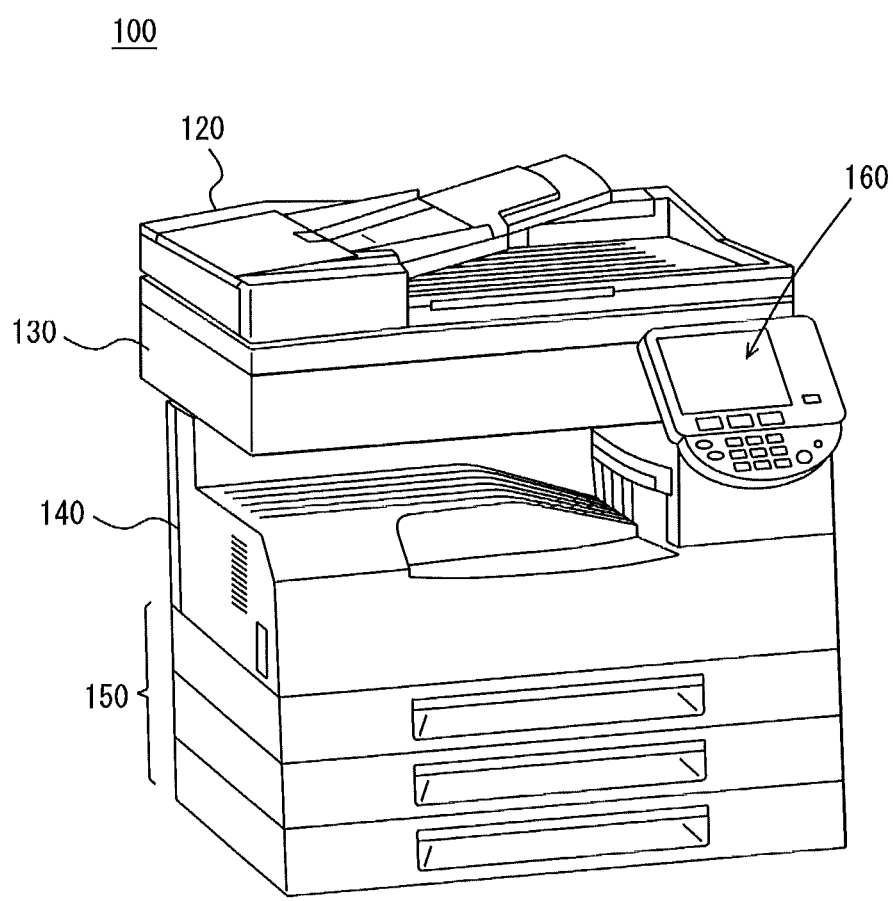
FIG. 1 is a perspective view of an MFP according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a perspective view of an MFP according to an embodiment of the present invention. FIG. 2 is a plan view showing an example of an operation panel. Referring to FIGS. 1 and 2, an MFP 100 includes: a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Operation panel 160 is arranged on an upper surface of MFP 100. Operation panel 160 includes: a display portion 161, a touch panel 165, and a hard key portion 167. Display portion 161 is, for example, a liquid crystal display (LCD), and displays an instruction menu for a user, information about acquired image data, and so on. Hard key portion 167 includes four hard keys 167A to 167D having the characters "BOX", "FAX", "COPY", and "ECO" respectively displayed thereon. Touch panel 165, which is disposed on an upper or lower surface of display portion 161, detects a position on the display surface of display portion 161.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Figure 3:
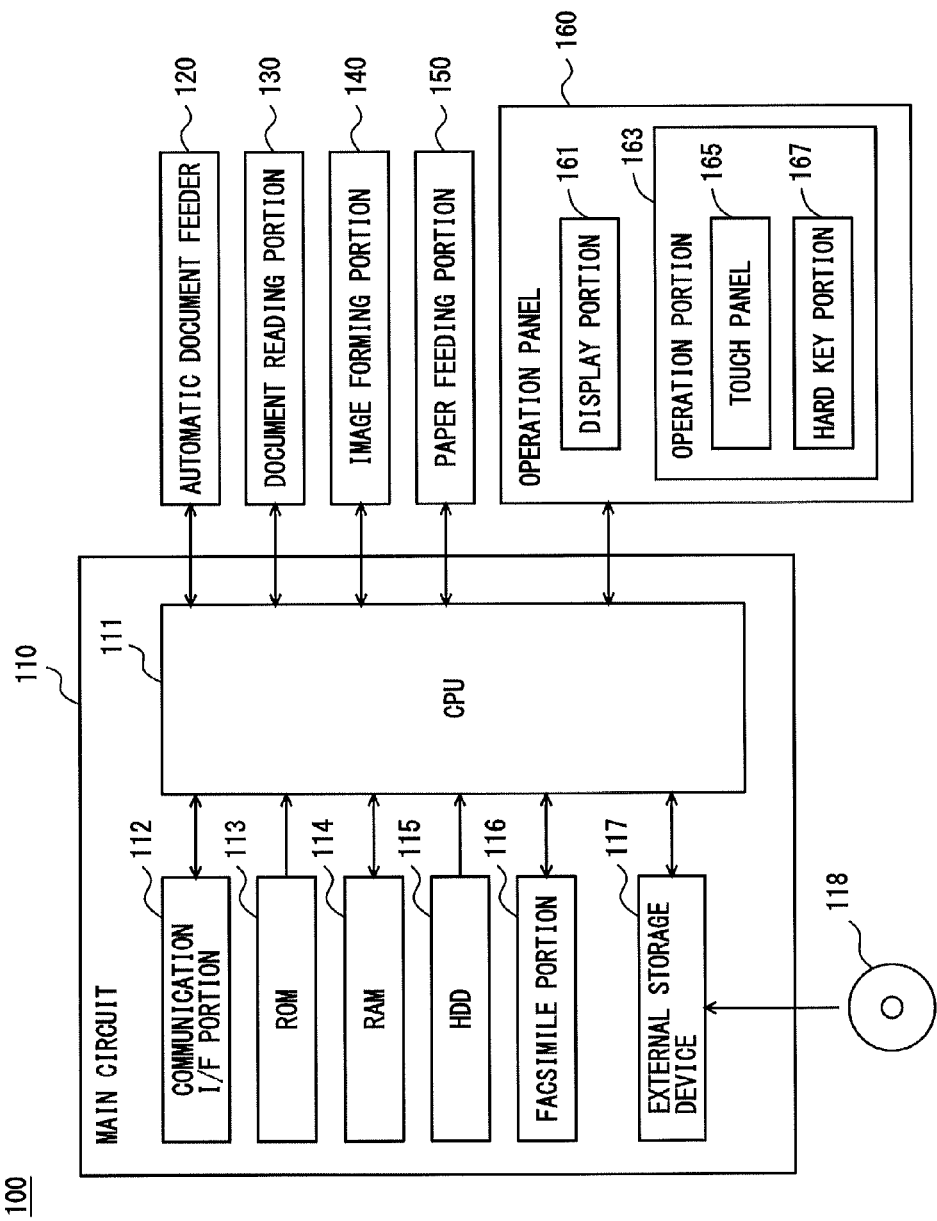
FIG. 3 is a block diagram schematically showing an example of the hardware configuration of the MFP.

FIG. 3 is a block diagram schematically showing an example of the hardware configuration of the MFP. Referring to FIG. 3, MFP 100 includes a main circuit 110. Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the print data to image forming portion 140, thereby causing image forming portion 140 to form an image on a sheet of paper on the basis of the facsimile data received by facsimile portion 116. Further, facsimile portion 116 converts the data read by document reading portion 130 or the data stored in HDD 115 into facsimile data, and transmits the facsimile data to a facsimile machine connected to the PSTN.

Communication I/F portion 112 is an interface for connecting MFP 100 to a network. Communication I/F portion 112 communicates with another computer connected to the network, using a communication protocol such as the transmission control protocol (TCP) or the file transfer protocol (FTP). It is noted that the protocol for communication is not particularly limited; any protocol can be used. The network to which communication I/F portion 112 is connected is, for example, a local area network (LAN). It may be connected in a wired or wireless manner. The network is not necessarily the LAN; it may be a wide area network (WAN), a network using the public switched telephone networks (PSTN), or the like. Furthermore, the network is connected to the Internet, so that it is possible for MFP 100 to communicate with a computer, such as a server, connected to the Internet.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 or the semiconductor memory mounted on external storage device 117, into RAM 114 for execution. It is noted that the program executed by CPU 111 is not restricted to the program recorded on CD-ROM 118 or the semiconductor memory. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Operation panel 160 includes display portion 161 and an operation portion 163. Display portion 161 is a display such as a liquid crystal display (LCD) or an organic electro-luminescence display (ELD), and displays an instruction menu for a user, information about acquired image data, and so on. Operation portion 163 includes touch panel 165 and hard key portion 167 made up of a plurality of hard keys. The hard keys included in hard key portion 167 each include a contact switch, which is connected to CPU 111. Each hard key, when depressed by an operation user, closes its contact to close a circuit connected to CPU 111. Each hard key closes the circuit while being depressed by an operation user who operates MFP 100, whereas it opens the circuit while not being depressed by the operation user.

When a plurality of keys included in hard key portion 167 are depressed, operation portion 163 accepts input data, such as instructions, characters, and numerical characters, according to the depressed keys. Touch panel 165 is disposed on an upper or lower surface of display portion 161, and outputs the coordinates of a position designated by the operation user to CPU 111. Touch panel 165 detects the position designated by the operation user with his/her finger or a stylus pen, and outputs the coordinates of the detected position to CPU 111. Touch panel 165 is a multi-touch screen panel. When a user designates a plurality of positions simultaneously, touch panel 165 outputs to CPU 111 a plurality of sets of coordinates corresponding respectively to the plurality of positions designated by the user.

Touch panel 165 preferably has a size equal to or greater than that of the display surface of display portion 161. As touch panel 165 is disposed on the surface of display portion 161, when the operation user designates a position on the display surface of display portion 161, touch panel 165 outputs the coordinates of the position that the operation user has designated on the display surface of display portion 161, to CPU 111. Touch panel 165 may be, for example, of a resistive type, a surface acoustic wave type, an infrared ray type, an electromagnetic induction type, or a capacitance type, although it is not limited to these types.

Operations that can be accepted by operation portion 163 include an operation of depressing any of the keys included in hard key portion 167 and an operation of designating a position on touch panel 165. Further, hard key portion 167 includes four hard keys 167A to 167D having the characters "BOX", "FAX", "COPY", and "ECO" respectively displayed thereon. Three hard keys 167A, 167B, and 167C with the characters "BOX", "FAX", and "COPY", respectively, are process switching keys assigned with process switching operations for designating switching of the process to be executed by MFP 100. Hard key 167D with the characters "ECO" is a mode switching key assigned with a mode switching operation for designating switching of the mode of MFP 100 from a normal mode to a power saving mode in which less electricity is consumed. When hard key 167A, 167B, or 167C is depressed, operation portion 163 accepts the corresponding process switching operation. When hard key 167D is depressed, operation portion 163 accepts the mode switching operation.

Figure 4:
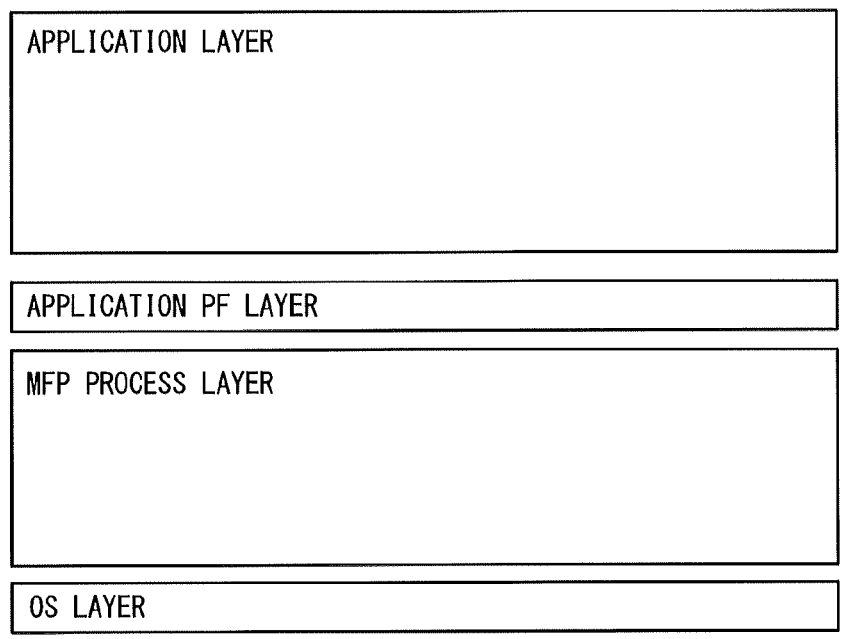
FIG. 4 shows an example of the software architecture of a CPU included in the MFP.

FIG. 4 shows an example of the software architecture of the CPU included in the MFP. Referring to FIG. 4, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs the process of controlling hardware resources of MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, and operation panel 160. The task belonging to the OS layer controls the hardware resources in accordance with an operating command input from the MFP process layer. Further, the OS layer shares, with the MFP process layer, a plurality of pieces of operation identification information for respectively identifying a plurality of types of operations that can be accepted by operation portion 163.

When operation portion 163 detects an operation performed by an operation user, the task belonging to the OS layer outputs a piece of operation identification information for identifying the detected operation, to the MFP process layer.

A task for CPU 111 to execute an application program belongs to the application layer. In the case where two or more application programs are installed into MFP 100, two or more tasks of executing the respective application programs may belong to the application layer. The application programs include a program for causing MFP 100 to perform a browsing process of downloading a Web page from a server connected to the Internet and displaying the page. It is noted that the application programs are not restricted to the above-described programs; there may be a program for customizing a user interface and the like so as to cause MFP 100 to perform the copying process, scanning process, printing process, facsimile transmitting/receiving process, data transmitting/receiving process, and so on. An application program is described, for example, in a programming language such as Python, although the language is not particularly limited.

The task of executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task of executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program that can be installed into MFP 100.

Further, the task of executing the application program specifies a process to be performed, from among the plurality of types of processes determined by the application program, on the basis of an instruction from the operation user who operates MFP 100. The task of executing the application program then performs the specified process. The instruction from the operation user operating MFP 100 is accepted in the OS layer when the operation user operates operation portion 163 to input the instruction. In the present embodiment, the application PF layer is in charge of specifying, on the basis of an instruction from the operation user, one of the plurality of types of processes that is to be performed by the task of executing the application program. Therefore, the application layer shares, with the application PF layer, a plurality of pieces of process identification information for respectively identifying the plurality of types of processes determined by the application program. When the task of executing the application program, belonging to the application layer, receives process identification information from a task belonging to the application PF layer, the task of executing the application program performs the one of the plurality of types of processes that corresponds to the received process identification information.

The application PF layer, located between the application layer and the MFP process layer, has belonging thereto a task of arbitrating a plurality of tasks belonging to the application layer and also controlling the application commands output from the plurality of tasks belonging to the application layer. More specifically, the application PF layer brings one of the tasks belonging to the application layer into a currently selected state in which data can be input/output. The application PF layer accepts an application command output from the one of the tasks belonging to the application layer that has been set in the currently selected state, and outputs the process identification information input from a task belonging to the MFP process layer, to the task in the currently selected state. Further, the task belonging to the application PF layer converts the application commands, output from the respective tasks belonging to the application layer, into internal commands in accordance with a predetermined rule, for standardization, and outputs the internal commands to the MFP process layer. This can address the case where a plurality of application programs are different in version, or the like.

Application commands are associated with internal commands in advance. For example, a commands correspondence table may be stored. One application command may correspond to one internal command, or one application command may correspond to a set of two or more internal commands. Further, two or more application commands of different versions may correspond to one internal command or to a set of two or more internal commands. This can address the case where application programs are of different versions. The internal command is a command which depends upon the hardware resource(s) in MFP 100. Internal commands are not released usually, although they may be released.

The MFP process layer, located between the application PF layer and the OS layer, has belonging thereto a task for CPU 111 to execute an MFP control program. The MFP process layer has belonging thereto a task of converting an internal command output from a task belonging to the application PF layer, into an operating command which can be interpreted by a task belonging to the OS layer, and outputting the operating command to the task belonging to the OS layer for controlling the hardware resource(s). While an internal command is actually converted into one or more operating commands which can be executed by a task belonging to the OS layer, for the convenience sake, it is here assumed that one internal command is converted into one operating command executable by the task belonging to the OS layer. When the MFP process layer receives operation identification information from a task belonging to the OS layer, the MFP process layer outputs the operation identification information to the application PF layer.

While the application programs cause MFP 100 to perform the browsing process, copying process, scanning process, printing process, facsimile transmitting/receiving process, data transmitting/receiving process, and so on, as previously described, the following description will focus on the part related to the process of controlling operation panel 160, among the processes the application programs cause CPU 111 to perform.

Figure 5:
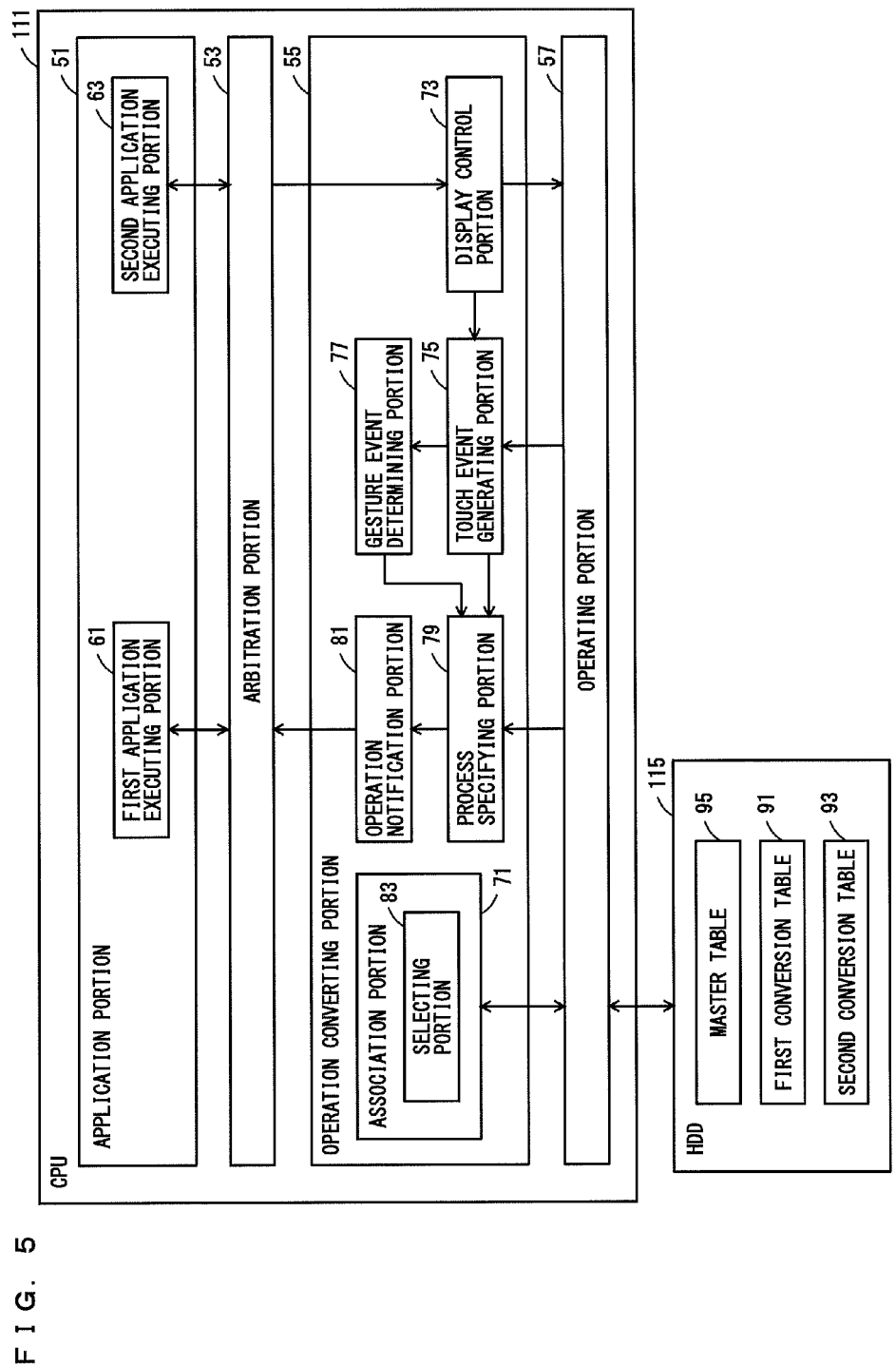
FIG. 5 is a block diagram showing, by way of example, the functions of the CPU included in the MFP, together with information stored in a HDD.

FIG. 5 is a block diagram showing, by way of example, the functions of the CPU included in the MFP, together with information stored in the HDD. The functions shown in FIG. 5 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an operation standardization program, and an application program. Shown here are the functions of CPU 111 implemented when a first application program and a second application program are installed in MFP 100 as the application programs.

Referring to FIG. 5, CPU 111 includes an application portion 51, an arbitration portion 53, an operation converting portion 55, and an operating portion 57. Application portion 51 belongs to the application layer in the software architecture shown in FIG. 4. Application portion 51 includes a first application executing portion 61 and a second application executing portion 63. First application executing portion 61 is a function implemented by a task for CPU 111 to execute a first application program. Second application executing portion 63 is a function implemented by a task for CPU 111 to execute a second application program. Each of first application executing portion 61 and second application executing portion 63 outputs an application command to arbitration portion 53.

First application executing portion 61 specifies a process to be performed, from among a plurality of types of processes determined by the first application program, on the basis of an instruction from an operation user who operates MFP 100, and performs the specified process. Second application executing portion 63 specifies a process to be performed, from among a plurality of types of processes determined by the second application program, on the basis of an instruction from the operation user who operates MFP 100, and performs the specified process. The plurality of types of processes determined by the first application program and those determined by the second application program both include a process of changing a screen being displayed on display portion 161. For example, in the case where a part of a screen is being displayed on display portion 161, the process of changing a screen includes: scrolling for changing the part to be displayed on display portion 161; page turning; enlargement for zooming in on the screen; reduction for zooming out on the screen; and rotation for changing the direction of the screen.

Arbitration portion 53 and operation converting portion 55 are functions implemented by tasks for CPU 111 to execute an operation standardization program. Arbitration portion 53 belongs to the application PF layer in the software architecture shown in FIG. 4. Operation converting portion 55 also belongs to the application PF layer in the software architecture shown in FIG. 4. While it is here assumed that all the functions of operation converting portion 55 belong to the application PF layer, it may be configured such that at least some of the functions of operation converting portion 55 belong to the application PF layer and the rest belong to the MFP process layer.

Arbitration portion 53 brings either first application executing portion 61 or second application executing portion 63 into a currently selected state in which data can be input/output. Hereinafter, the one of first and second application executing portions 61, 63 that has been set in the currently selected state by arbitration portion 53 will be referred to as "current task". Arbitration portion 53 receives an application command output from the current task, which is either first application executing portion 61 or second application executing portion 63, and outputs application identification information for identifying the current task and the application command to operation converting portion 55. When first application executing portion 61 is in the currently selected state, first application executing portion 61 is the current task, and thus, arbitration portion 53 outputs the application identification information for identifying first application executing portion 61 and the application command output from first application executing portion 61, to operation converting portion 55. When second application executing portion 63 is in the currently selected state, second application executing portion 63 is the current task, and thus, arbitration portion 53 outputs the application identification information for identifying second application executing portion 63 and the application command output from second application executing portion 63, to operation converting portion 55.

When a plurality of application commands are output from each of first and second application executing portions 61, 63, arbitration portion 53 determines the order of the application commands, and sequentially outputs them in the determined order to operation converting portion 55. For example, in the case where a plurality of application commands cannot be executed at the same time, arbitration portion 53 waits until operation converting portion 55 finishes the execution of one application command before arbitration portion 53 outputs another application command to operation converting portion 55. In the case where one application command can be executed only after the execution of another application command is finished, even if the one application command is input earlier than the other application command, arbitration portion 53 outputs the other application command first.

Operation converting portion 55 receives an application command from arbitration portion 53, and converts the application command, in accordance with a commands correspondence table, into an internal command for standardization. The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Further, operation converting portion 55 converts the standardized internal command into an operating command, and outputs the operating command to operating portion 57. The operating command is a command that has been predetermined between operation converting portion 55 and operating portion 57 and that can be interpreted by operating portion 57.

Operating portion 57 is a function implemented by a task for CPU 111 to execute an OS program. Operating portion 57 belongs to the OS layer in the software architecture shown in FIG. 4.

Operating portion 57 receives an operating command output from operation converting portion 55, and controls hardware resources in accordance with the operating command. Here, display portion 161 and touch panel 165 in operation portion 163 will be described as examples of the hardware resources. Operating portion 57 controls display portion 161 to cause it to display an image.

Furthermore, operating portion 57 accepts a position on the display surface of display portion 161 that is output from touch panel 165. In the case of accepting positional information from touch panel 165, operating portion 57 outputs, as operation identification information, a mouse event including the positional information, to operation converting portion 55. In the case where operating portion 57 controls hard key portion 167, operating portion 57 accepts hard key identification information that is output from hard key portion 167, and outputs operation identification information including the hard key identification information accepted, to operation converting portion 55.

Operating portion 57 may accept two or more pieces of positional information from touch panel 165 at the same time. For example, in the case where an operation user uses two fingers to designate two different locations simultaneously on the display surface of display portion 161, then operating portion 57 accepts two pieces of positional information indicating the respective positions designated on the display surface. In the case of accepting two or more pieces of positional information simultaneously from touch panel 165, operating portion 57 outputs, as operation identification information, a mouse event including the two or more pieces of positional information, to operation converting portion 55. In the case where an operation user designates one position with a finger on the display surface of display portion 161 while depressing one of a plurality of hard keys included in hard key portion 167, then operating portion 57 accepts the identification information for identifying the depressed hard key and the positional information indicating the position designated on the display surface, and outputs operation identification information including the accepted key identification information and positional information, to operation converting portion 55.

Operation converting portion 55 includes an association portion 71, a display control portion 73, a touch event generating portion 75, a gesture event determining portion 77, a process specifying portion 79, and an operation notification portion 81.

In the case where a set of the application identification information of a current task and an application command instructing to display an operation screen is received from arbitration portion 53, display control portion 73 outputs an operating command, which is obtained as a result of conversion of the application command instructing to display an image of the operation screen into the operating command, to operating portion 57. Operating portion 57 controls display portion 161 to cause it to display an image of the operation screen.

Operating portion 57 causes touch panel 165 to detect a position designated by a user at prescribed time intervals, to acquire positional information from touch panel 165 at the prescribed time intervals. In the case where designation by a user has been detected by touch panel 165, operating portion 57 outputs a mouse event, including positional information indicating the position designated by the user and a state of designation, to touch event generating portion 75. The mouse event is a type of the operation identification information. The user operations of designating touch panel 165 include: a designation starting operation in which a user designates an arbitrary position on touch panel 165; a move operation in which the user moves the designated position while designating (or, touching) touch panel 165; and an exit operation in which the user terminates the designation on touch panel 165. The state of designation included in the mouse event which operating portion 57 outputs at the time when a user has input the designation starting operation is "Press". The state of designation included in the mouse event which operating portion 57 outputs at the time when a user has input the move operation is "Move". The state of designation included in the mouse event which operating portion 57 outputs at the time when a user has input the exit operation is "Release".

When touch event generating portion 75 receives a mouse event from operating portion 57, touch event generating portion 75 converts the mouse event into a touch event. The touch event includes the positional information indicating the position designated by a user and a state of the touch event. The state of the touch event corresponds to the state of designation included in the mouse event. Specifically, the state of the touch event corresponding to the state of designation "Press" included in the mouse event is "Start". The state of the touch event corresponding to the state of designation "Move" included in the mouse event is "Update". The state of the touch event corresponding to the state of designation "Release" included in the mouse event is "Exit". Touch event generating portion 75 changes the state of designation included in the mouse event to the corresponding state of the touch event, to thereby generate a touch event, and outputs the generated touch event to gesture event determining portion 77 and process specifying portion 79.

In the case where two or more mouse events are input from operating portion 57, touch event generating portion 75 generates two or more touch events corresponding respectively to the mouse events. When touch event generating portion 75 generates one or more touch events, it outputs the generated touch event(s) to gesture event determining portion 77 and process specifying portion 79.

Gesture event determining portion 77 determines a gesture event on the basis of a plurality of touch events continuously input from touch event generating portion 75. In the case where a first touch event and a second touch event are input simultaneously from touch event generating portion 75, gesture event determining portion 77 determines a gesture event on the basis of a first set of touch events continuously input in relation to the first touch event, and a second set of touch events continuously input in relation to the second touch event. Gesture event determining portion 77 outputs the determined gesture event to process specifying portion 79. The touch events included in the first set have their positional information identical to or continuous with one another. The touch events included in the second set have their positional information identical to or continuous with one another. Therefore, gesture event determining portion 77 refers to the positional information included in each of a plurality of touch events input simultaneously, to determine whether the touch event belongs to the first set or the second set.

When touch events are input continuously from touch event generating portion 75 to gesture event determining portion 77, the state of the firstly input touch event is "Start". Then, when a touch event the state of which is "Update" is input, gesture event determining portion 77 calculates a distance between the two points, on the basis of the positional information included in the touch event whose state is "Start" and the positional information included in the touch event whose state is "Update", and detects a user's swipe operation if the distance is a prescribed threshold value T or greater, while it detects a user's flick operation if the distance is smaller than the prescribed threshold value T. When a plurality of touch events are input, a user's flick operation may be detected by earlier touch events and a user's swipe operation may be detected by later touch events. When gesture event determining portion 77 detects a swipe operation or a flick operation, it calculates a direction from the position specified by the positional information included in the preceding touch event toward the position specified by the positional information included in the succeeding touch event, and sets one of the left, right, top, and down directions relative to the display surface of display portion 161 that is closest to the calculated direction, as a parameter. Gesture event determining portion 77 then outputs the gesture identification information and the parameter to process specifying portion 79. When detecting a swipe operation, gesture event determining portion 77 outputs the gesture identification information "Swipe" and a parameter to process specifying portion 79. When detecting a flick operation, gesture event determining portion 77 outputs the gesture identification information "Flick" and a parameter to process specifying portion 79.

In the case where two touch events are input simultaneously from touch event generating portion 75 to gesture event determining portion 77, the state of each of the firstly input touch events is "Start". In this case, gesture event determining portion 77 calculates, on the basis of the positional information included in the respective touch events, a distance L1 between the two points and an angle R1 of a straight line connecting the two points. The angle of the straight line connecting the two points may be an angle between the straight line and a reference line extending in a lateral direction of display portion 161. The angle between the reference line and the straight line connecting the two points is calculated clockwise from the reference line. Then, as two touch events are subsequently input continuously, gesture event determining portion 77 calculates, on the basis of the positional information included in the respective touch events, a distance L2 between the two points and an angle R2 of a straight line connecting the two points.

In the case where the angle R1 and the angle R2 are the same and the distance L2 is different from the distance L1, then gesture event determining portion 77 detects a pinch-out operation or a pinch-in operation by a user. Here, the determination that the angle R1 and the angle R2 are the same means that the difference between the angle R1 and the angle R2 is within a prescribed range. A certain margin of error is set for detecting the motions of the user fingers. If the distance L2 is greater than the distance L1, gesture event determining portion 77 detects a pinch-out operation. If the distance L2 is smaller than the distance L1, gesture event determining portion 77 detects a pinch-in operation. When detecting a pinch-out or pinch-in operation, gesture event determining portion 77 calculates a scaling factor by dividing the distance L2 by the distance L1, and sets the calculated scaling factor as a parameter. Gesture event determining portion 77 then outputs the gesture identification information and the parameter to process specifying portion 79. When detecting a pinch-out operation, gesture event determining portion 77 outputs the gesture identification information "Pinch Out" and a parameter to process specifying portion 79. When detecting a pinch-in operation, gesture event determining portion 77 outputs the gesture identification information "Pinch In" and a parameter to process specifying portion 79.

In the case where the angle R1 and the angle R2 are different from each other, gesture event determining portion 77 detects a rotation operation by a user. Here, the determination that the angle R1 and the angle R2 are different from each other means that the difference between the angle R1 and the angle R2 is outside the prescribed range. A certain margin of error is set for detecting the motions of the user fingers. When detecting a rotation operation, gesture event determining portion 77 determines the direction of rotation by subtracting the angle R1 from the angle R2, and sets the determined rotational direction as a parameter. Gesture event determining portion 77 then outputs the gesture identification information "Rotation" and the parameter to process specifying portion 79. If the value obtained by subtracting the angle R1 from the angle R2 is positive, the rotational direction is clockwise. If the value is negative, the rotational direction is counterclockwise.

<Modification of Touch Event Generating Portion>

It is noted that there is a case where operating portion 57 outputs positional information alone, without outputting a mouse event. If no mouse event is output from operating portion 57, touch event generating portion 75 generates a touch event on the basis of the positional information output from operating portion 57. Touch event generating portion 75 outputs a request to output positional information to operating portion 57 at prescribed time intervals, to acquire the positional information from operating portion 57 at the prescribed time intervals. When operating portion 57 receives the output request from touch event generating portion 75, if a user is designating a position on touch panel 165, operating portion 57 outputs the positional information indicating the position being designated by the user. If a user is not designating a position on touch panel 165, operating portion 57 does not output positional information.

Touch event generating portion 75 includes a state detecting portion 76. State detecting portion 76 detects a state of the positional information which is input from operating portion 57 at prescribed time intervals. Specifically, state detecting portion 76 determines the state of the positional information on the basis of the positional information that is input from operating portion 57 at a first time and the positional information that is input from operating portion 57 at a second time which is a prescribed time after the first time. In the case where the position specified by the positional information input at the first time does not fall within a prescribed distance from the position specified by the positional information input at the second time, then state detecting portion 76 determines the state of the positional information input at the second time to be "Start". In the case where the position specified by the positional information input at the first time falls within the prescribed distance from the position specified by the positional information input at the second time, then state detecting portion 76 determines the state of the positional information input at the second time to be "Update". Further, in the case where positional information falling within a prescribed distance from the position specified by the positional information input at the first time is not input at the second time, then state detecting portion 76 determines, at the second time, the state of the positional information input at the first time to be "Exit". When state detecting portion 76 receives a plurality of pieces of positional information from operating portion 57, state detecting portion 76 determines the state of the positional information for each piece of the positional information.

When touch event generating portion 75 receives positional information from operating portion 57, touch event generating portion 75 generates a touch event which is made up of a set of the positional information and the state detected by state detecting portion 76 for that positional information. Specifically, in the case where state detecting portion 76 determines, at the second time, that the state of the positional information input at the second time is "Start", touch event generating portion 75 generates a touch event that includes the positional information input at the second time and the state "Start". In the case where state detecting portion 76 determines, at the second time, that the state of the positional information input at the second time is "Update", touch event generating portion 75 generates a touch event including the positional information input at the second time and the state "Update". In the case where state detecting portion 76 determines, at the second time, that the state of the positional information input at the first time is "Exit", touch event generating portion 75 generates a touch event including the positional information input at the first time and the state "Exit".

When touch event generating portion 75 receives a plurality of pieces of positional information from operating portion 57, touch event generating portion 75 generates a plurality of touch events corresponding to the respective pieces of positional information. When touch event generating portion 75 generates one or more touch events, it outputs the generated touch event(s) to gesture event determining portion 77 and process specifying portion 79.

The user operations of designating touch panel 165 include: a designation starting operation in which a user designates an arbitrary position on touch panel 165; a move operation in which the user moves the designated position while designating (or, touching) touch panel 165; and an exit operation in which the user terminates the designation on touch panel 165. The touch event including the positional information state "Start" indicates the designation starting operation. The touch event including the positional information state "Update" indicates the move operation. The touch event including the positional information state "Exit" indicates the exit operation.

Association portion 71 functions, at the stage when an application program is installed, to associate each of a plurality of types of processes determined by the application program with one of a plurality of gesture events. HDD 115 stores a master table 95 in advance. In master table 95, a plurality of pieces of process identification information are associated in advance with a plurality of gesture events.

FIG. 6 shows an example of a master table. Referring to FIG. 6, master table 95 includes a master record for each of a plurality of pieces of process identification information. Each master record includes a "process" field and a "gesture" field. In the "process" field, process identification information is set. In the "gesture" field, gesture identification information for identifying a gesture event is set. In the case where an application program is newly developed and the new application program includes any piece of process identification information different from the pieces of process identification information included in master table 95, master table 95 is updated so as to include a master record corresponding to the new piece of process identification information.

For example, the master record with the process identification information "Scroll" set in the "process" field has the gesture identification information "Flick" set in the "gesture" field. The process specified by the process identification information "Scroll" is the process of scrolling a screen to the left, right, up, or down. The gesture event specified by the gesture identification information "Flick" corresponds to the user operation of moving a finger, while designating a position on touch panel 165, to the left, right, up, or down at a speed lower than a prescribed speed. As the direction of moving a finger is determined during the operation of moving the finger at a speed lower than the prescribed speed, the gesture event specified by the gesture identification information "Flick" includes the direction of moving the finger as a parameter.

The master record with the process identification information "Enlargement" set in the "process" field has the gesture identification information "Pinch Out" set in the "gesture" field. The process specified by the process identification information "Enlargement" is the process of zooming in on the screen. The gesture event specified by the gesture identification information "Pinch Out" corresponds to the user operation of moving at least one of the two locations designated on touch panel 165 such that the distance between the two locations increases. As the distance between the two locations is changed during the operation of moving the finger(s) to increase the distance between the two locations, the gesture event specified by the gesture identification information "Pinch Out" includes, as a parameter, a scaling factor indicating the rate of change of the distance between the two locations.

The master record with the process identification information "Reduction" set in the "process" field has the gesture identification information "Pinch In" set in the "gesture" field. The process specified by the process identification information "Reduction" is the process of zooming out on the screen. The gesture event specified by the gesture identification information "Pinch In" corresponds to the user operation of moving at least one of the two locations designated on touch panel 165 such that the distance between the two locations decreases. As the distance between the two locations is changed during the operation of moving the finger(s) to decrease the distance between the two locations, the gesture event specified by the gesture identification information "Pinch In" includes, as a parameter, a scaling factor indicating the rate of change of the distance between the two locations.

The master record with the process identification information "Rotation" set in the "process" field has the gesture identification information "Rotation" set in the "gesture" field. The process specified by the process identification information "Rotation" is the process of rotating a screen to change the direction of the screen. The gesture event specified by the gesture identification information "Rotation" is detected when the user operation of moving at least one of the two locations designated on touch panel 165 such that the direction of the straight line connecting the two locations is changed is input. For example, a user may input an operation of drawing an arc with one finger about the location designated by the other finger. As the direction in which the arc is drawn is clockwise or counterclockwise, the gesture event specified by the gesture identification information "Rotation" includes either the clockwise direction or the counterclockwise direction as a parameter.

The master record with the process identification information "Page Turning" set in the "process" field has the gesture identification information "Swipe" set in the "gesture" field. The process specified by the process identification information "Page Turning" is the process of changing the screen to a next page. The gesture event specified by the gesture identification information "Swipe" corresponds to the user operation of moving a finger, while designating a position on touch panel 165, to the left, right, up, or down at a speed equal to or higher than the threshold value that is also used for determination of the user operation corresponding to the gesture event identified by the gesture identification information "Flick". As the direction of moving a finger is determined during the operation of moving the finger at a speed equal to or higher than the threshold value, the gesture event specified by the gesture identification information "Swipe" includes the direction of moving the finger as a parameter.

Returning to FIG. 5, association portion 71 includes a selecting portion 83. Selecting portion 83 reads master table 95 stored in HDD 115. More specifically, selecting portion 83 outputs an operating command instructing to read master table 95 to operating portion 57, and acquires master table 95 that operating portion 57 reads by controlling HDD 115. At the stage when an application program is installed, selecting portion 83 refers to master table 95 to specify any processes that need to be standardized, from among a plurality of types of processes determined by the application program, and selects a gesture event that is associated by master table 95 with each of a plurality of pieces of process identification information that respectively identify the specified processes to be standardized. A process to be standardized refers to the process which is included in a plurality of types of processes determined by the application program and for which a triggering event has been determined by the application program as an event which is different from the occurrence of a set of mouse events that determines the gesture event defined in master table 95. For example, it is here assumed that the application program supports, not a multi-touch type touch panel 165, but a single-touch type touch panel, and that the enlargement, reduction, and rotation processes are determined by the application program. In this case, the events for triggering the enlargement, reduction, and rotation processes may be the events of accepting user operations performed on the setting screens corresponding respectively to the enlargement, reduction, and rotation processes, or the events of accepting user operations of designating the predetermined operation buttons. Therefore, the events for triggering the enlargement, reduction, and rotation processes are determined by the application program as the events which are different from the occurrences of the sets of mouse events determining the gesture events identified by the respective pieces of gesture identification information "Pinch Out", "Pinch In", and "Rotation" defined in master table 95.

Further, there may be a case where, while the scrolling process is determined by the application program, the event for triggering the scrolling process may be a touch event of moving a scroll bar. Therefore, the event for triggering the scrolling process is determined by the application program as the event which is different from the occurrence of the set of mouse events determining the gesture event identified by the gesture identification information "Flick" defined in master table 95.

Association portion 71 generates conversion records, each associating one of a plurality of pieces of process identification information for identifying the respective processes to be standardized, specified by selecting portion 83, with a gesture event that has been selected by selecting portion 83 for that piece of process identification information, and adds the generated conversion records to a conversion table.

Association portion 71 stores a conversion table which has been generated for an application program, into HDD 115, in association with the application program. Specifically, at the stage when a first application program is installed, association portion 71 generates a first conversion table 91 for the first application program, and stores the table into HDD 115. At the stage when a second application program is installed, association portion 71 generates a second conversion table 93 for the second application program, and stores the table into HDD 115. More specifically, association portion 71 outputs to operating portion 57 an operating command instructing to store first conversion table 91 or second conversion table 93, and operating portion 57 in turn controls HDD 115 to store first conversion table 91 or second conversion table 93.

FIG. 7 shows an example of a first conversion table. Referring to FIG. 7, first conversion table 91 is generated at the stage when the first application program is installed into MFP 100, and includes conversion records which correspond respectively to a plurality of types of processes which have been determined by the first application program and which need to be standardized. Each conversion record includes a "process" field and a "gesture" field. In the "process" field, process identification information for identifying one of the plurality of types of processes which have been determined by the first application program and which need to be standardized is set. In the "gesture" field, gesture identification information for identifying a gesture event is set.

It is here assumed that the pieces of process identification information for identifying the plurality of types of processes which have been determined by the first application program and which need to be standardized are: "Scroll", "Enlargement", "Reduction", "Rotation", and "Page Turning". In master table 95 shown in FIG. 6, one piece of process identification information is associated with one piece of gesture identification information. Therefore, the process identification information "Scroll" is associated with the gesture identification information "Flick", the process identification information "Enlargement" is associated with the gesture identification information "Pinch Out", the process identification information "Reduction" is associated with the gesture identification information "Pinch In", the process identification information "Rotation" is associated with the gesture identification information "Rotation", and the process identification information "Page Turning" is associated with the gesture identification information "Swipe".

FIG. 8 shows an example of a second conversion table. Referring to FIG. 8, second conversion table 93 is generated at the stage when the second application program is installed into MFP 100, and includes conversion records which correspond respectively to a plurality of types of processes which have been determined by the second application program and which need to be standardized. Each conversion record includes a "process" field and a "gesture" field. In the "process" field, process identification information for identifying one of the plurality of types of processes which have been determined by the second application program and which need to be standardized is set. In the "gesture" field, gesture identification information for identifying a gesture event is set.

It is here assumed that the pieces of process identification information for identifying the plurality of types of processes which have been determined by the second application program and which need to be standardized are: "Scroll" and "Page Turning". In master table 95 shown in FIG. 6, one piece of process identification information is associated with one piece of gesture identification information. Therefore, the process identification information "Scroll" is associated with the gesture identification information "Flick", and the process identification information "Page Turning" is associated with the gesture identification information "Swipe".

Accordingly, even in the case where the first application program does not support a multi-touch type touch panel, or even in the case where the plurality of types of processes which have been determined by the first or second application program and which need to be standardized are performed in accordance with, for example, user operations of designating a scroll bar on the screen or depressing hard keys included in hard key portion 167, it is possible to associate each of the plurality of types of processes which have been determined by the first or second application program and which need to be standardized, with a user operation input into touch panel 165.

Returning to FIG. 5, process specifying portion 79 may receive touch events from touch event generating portion 75, or receive a gesture event from gesture event determining portion 77. Process specifying portion 79 reads one of first conversion table 91 and second conversion table 93 stored in HDD 115 that corresponds to the application identification information for identifying the current task being set by arbitration portion 53. Specifically, in the case where first application executing portion 61 has been set as the current task by arbitration portion 53, process specifying portion 79 reads first conversion table 91. In the case where second application executing portion 63 has been set as the current task, process specifying portion 79 reads second conversion table 93. More specifically, process specifying portion 79 outputs an operating command instructing to read first conversion table 91 or second conversion table 93, to operating portion 57, and acquires first conversion table 91 or second conversion table 93 that operating portion 57 reads by controlling HDD 115. In the following description, it is assumed that first application executing portion 61 is the current task.

In response to reception of a gesture event from gesture event determining portion 77, process specifying portion 79 specifies, on the basis of the gesture event, one of a plurality of types of processes that is associated with the gesture event in correspondence with the application program that is executed by the task being set in the currently selected state by arbitration portion 53. Here, as first application executing portion 61 that executes the first application program has been set in the currently selected state by arbitration portion 53, process specifying portion 79 specifies the process that is associated by first conversion table 91 with the gesture event input from gesture event determining portion 77. More specifically, process specifying portion 79 extracts, from first conversion table 91, a conversion record in which the gesture identification information for identifying the gesture event input from gesture event determining portion 77 is set in the "gesture" field, and acquires the process identification information that is set in the "process" field in the extracted conversion record. Process specifying portion 79 outputs the acquired process identification information to operation notification portion 81. As the gesture event includes the positional information and the parameter, process specifying portion 79 also outputs the positional information and the parameter, together with the process identification information.

In the case where no gesture event is input from gesture event determining portion 77, process specifying portion 79 outputs a plurality of touch events input from touch event generating portion 75, to operation notification portion 81.

Operation notification portion 81 receives process identification information or a plurality of touch events from process specifying portion 79. In the case where a gesture event is input from gesture event determining portion 77, operation notification portion 81 outputs the process identification information input from process specifying portion 79, to the current task. Specifically, operation notification portion 81 generates an application command for causing a process specified by the process identification information to be performed. Then, operation notification portion 81 requests arbitration portion 53 to output the generated application command to the current task, which is here first application executing portion 61. As a result, first application executing portion 61 performs the process specified by the process identification information. Accordingly, it is possible to cause first application executing portion 61, which executes the first application program, to perform the process corresponding to the operation (gesture event) that is input into touch panel 165 and specified by a set of touch events. In other words, at the stage of program development, an application program can be developed without any concern for the operations (the gesture events specified by sets of touch events) that can be accepted by touch panel 165 in MFP 100. For example, it is possible to develop an application program without considering, for example, whether or not touch panel 165 can detect a plurality of positions at the same time. Furthermore, although touch panel 165 here is a multi-touch type touch panel that can detect a plurality of positions simultaneously, even in the case where an application program that does not support such multi-touch type touch panel 165 is installed, when an operation of inputting two or more positions simultaneously, e.g. a pinch-out, pinch-in, or rotation operation, is performed on touch panel 165, it is possible to cause a task of executing the application program to perform the process corresponding to that operation.

In the case where no gesture event is input from gesture event determining portion 77, operation notification portion 81 outputs a plurality of touch events input from process specifying portion 79, as operation identification information, to the current task. This is because the first or second application program supports the operations each determined by a plurality of touch events. Therefore, even in the case where the second application program supports the operations accepted by multi-touch type touch panel 165, it is possible to install the second application program.

Figure 9:
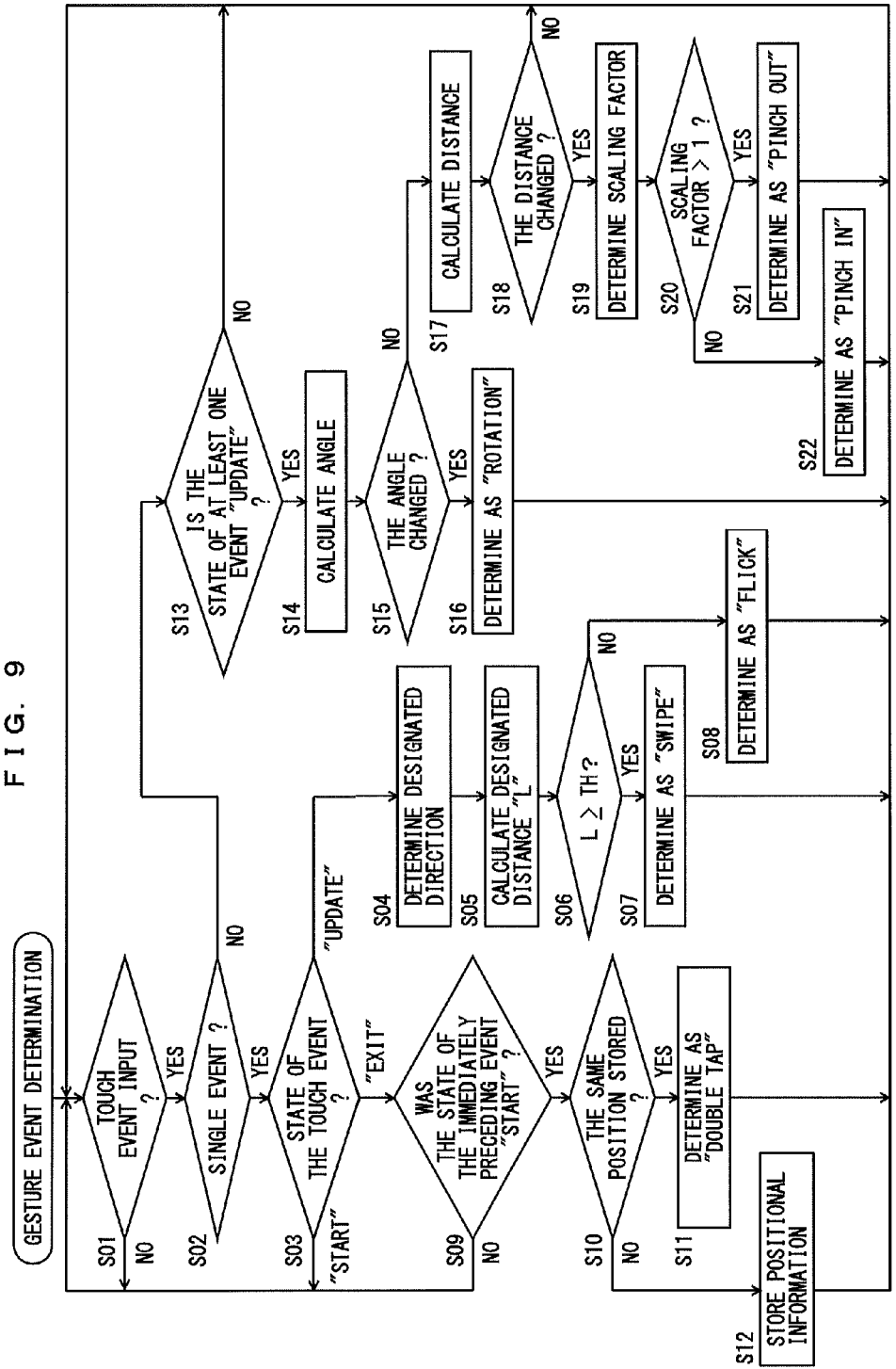
FIG. 9 is a flowchart illustrating an example of the flow of a gesture event determining process.

FIG. 9 is a flowchart illustrating an example of the flow of a gesture event determining process. The gesture event determining process is carried out by CPU 111 included in MFP 100 as CPU 111 executes the operation standardization program stored in ROM 113, HDD 115, or CD-ROM 118. Referring to FIG. 9, CPU 111 determines whether a touch event has been input (step S01). If a user designates a position on touch panel 165, a touch event is input on the basis of the position detected by touch panel 165. CPU 111 is in a standby mode until a touch even is input (NO in step S01), and once a touch event is input (YES in step S01), the process proceeds to step S02.

In step S02, CPU 111 determines whether a single touch event has been input. If a single touch event has been input, the process proceeds to step S03. If more than one touch event has been input, the process proceeds to step S13.

In step S03, the process branches in accordance with the state of the touch event. If the state of the touch event is "Start", the process returns to step S01. If the state of the touch event is "Update", the process proceeds to step S04. If the state of the touch event is "Exit", the process proceeds to step S09. The process proceeds to step S04 when the state of the touch event is "Update". This means that another touch event has been input immediately before the touch event. The state of the other touch event may be "Start" or "Update". In step S04, CPU 111 determines a designated direction. Specifically, CPU 111 determines the direction from the position specified by the positional information included in the other touch event input immediately before, to the position specified by the positional information included in the touch event input in step S01. The direction determined here is one of the left, right, up, and down directions relative to the display surface of display portion 161 that is closest to the calculated direction.

In the following step S05, CPU 111 calculates a designated distance L. Specifically, CPU 111 calculates, as the designated distance L, a distance between the position specified by the positional information included in the other touch event input immediately before, and the position specified by the positional information included in the touch event input in step S01. CPU 111 then determines whether the designated distance L is not smaller than a threshold value TH (step S06). If the designated distance L is equal to or greater than the threshold value TH, the process proceeds to step S07; otherwise, the process proceeds to step S08.

In step S07, CPU 111 determines the gesture event to be "Swipe", and the process returns to step S01. In step S08, CPU 111 determines the gesture event to be "Flick", and the process returns to step S01.

The process proceeds to step S09 when the state of the touch event input in step S01 is "Exit", in which case another touch event has been input immediately before the touch event. The state of the other touch event may be "Start" or "Update". In step S09, the process branches in accordance with the state of the other touch event input immediately before. If the state of the other touch event input immediately before is "Start", the process proceeds to step S10; otherwise, the process returns to step S01.

In step S10, CPU 111 determines whether RAM 114 stores the same positional information as the one included in the touch event input in step S01. If so, the process proceeds to step S11; otherwise, the process proceeds to step S12. Here, the determination that the pieces of positional information are the same means that the distance between the two positions specified by the respective pieces of positional information is within a prescribed length. A certain margin of error is set for detecting the user operations of designating the same position.

In step S12, CPU 111 temporarily stores the positional information included in the touch event input in step S01, into RAM 114, and the process returns to step S01. The process proceeds to step S12 when the state of the touch event input immediately before is "Start" and the state of the touch event input subsequently is "Exit", and when the same positional information has not been stored in RAM 114. In other words, the process proceeds to step S12 when a user inputs a first tap operation.

In step S11, CPU 111 determines the gesture event to be "Double Tap", and the process returns to step S01. The process proceeds to step S11 when the state of the touch event input immediately before is "Start" and the state of the touch event input in step S01 is "Exit", and when the same positional information has been stored in RAM 114. In other words, the process proceeds to step S11 when a user, following the first tap operation, taps the same position as the firstly tapped position.

The process proceeds to step S13 in the case where two touch events are input. In step S13, CPU 111 determines whether the state of at least one of the two touch events is "Update". If so, the process proceeds to step S14; otherwise, the process returns to step S01.

In step S14, CPU 111 calculates an angle. Specifically, CPU 111 calculates the angle between the straight line connecting the two positions specified by the respective pieces of positional information included in the two touch events and a prescribed reference side on the display surface of display portion 161. In the following step S15, CPU 111 determines whether the angle calculated in step S14 has been changed. It is determined that the angle has been changed if the difference between the angle calculated in step S14 and the angle calculated on the basis of another set of two touch events input immediately before is a prescribed value or greater. If the angle has been changed, the process proceeds to step S16; otherwise, the process proceeds to step S17. In step S16, CPU 111 determines the gesture event to be "Rotation", and the process returns to step S01.

In step S17, CPU 111 calculates a distance. Specifically, CPU 111 calculates the distance between the two positions specified by the respective pieces of positional information included in the two touch events. In the following step S18, CPU 111 determines whether the distance calculated in step S17 has been changed. It is determined that the distance has been changed if the difference between the distance calculated in step S17 and the distance calculated on the basis of the other set of two touch events input immediately before is a prescribed value or greater. If the distance has been changed, the process proceeds to step S19; otherwise, the process returns to step S01.

In step S19, CPU 111 determines a scaling factor. Specifically, CPU 111 determines the value obtained by dividing the distance calculated in step S17 by the distance calculated on the basis of the other set of two touch events input immediately before, as the scaling factor. CPU 111 then determines whether the scaling factor is greater than 1 (step S20). If so, the process proceeds to step S21; otherwise, the process proceeds to step S22.

In step S21, CPU 111 determines the gesture event to be "Pinch Out", and the process returns to step S01. In step S22, CPU 111 determines the gesture event to be "Pinch In", and the process returns to step S01.

Figure 10:
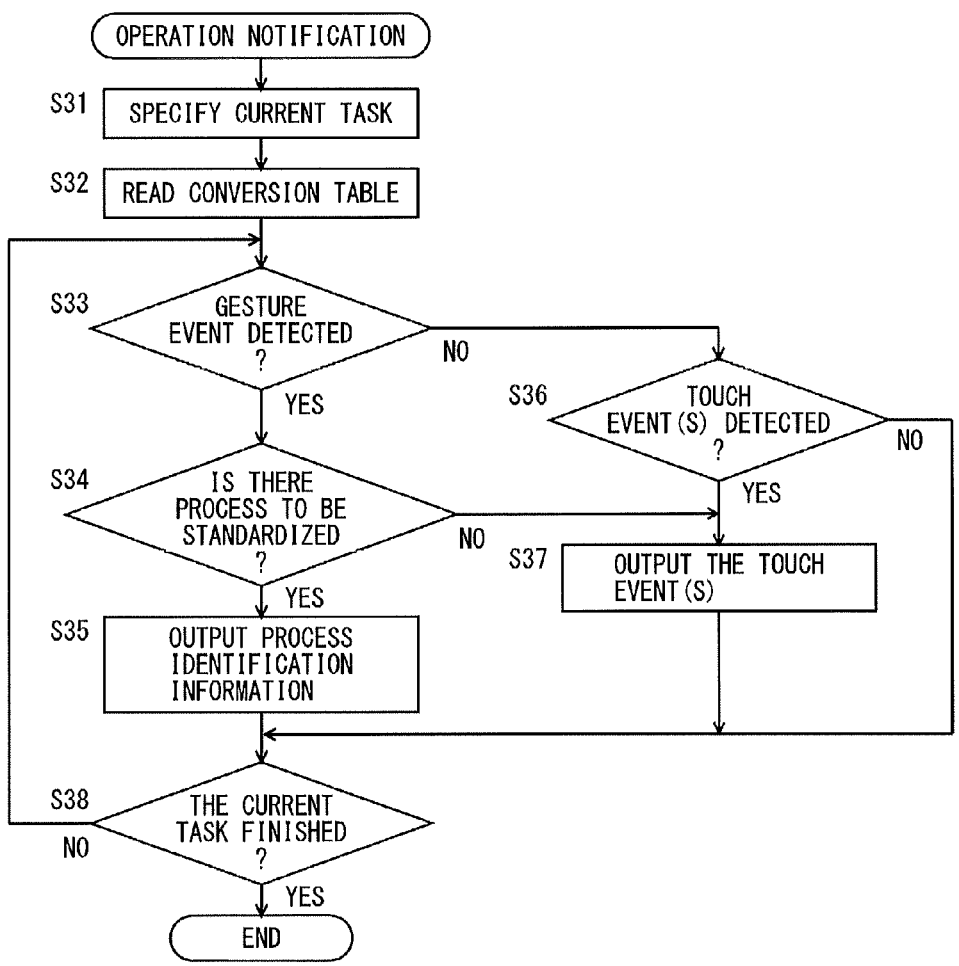
FIG. 10 is a flowchart illustrating an example of the flow of an operation notification process.

FIG. 10 is a flowchart illustrating an example of the flow of an operation notification process. The operation notification process is carried out by CPU 111 included in MFP 100 as CPU 111 executes the operation standardization program stored in ROM 113, HDD 115, or CD-ROM 118. Referring to FIG. 10, CPU 111 specifies a current task (step S31). Specifically, CPU 111 determines which of the task of executing the first application program and the task of executing the second application program is the current task. In the following description, it is assumed that the task of executing the first application program has been specified as the current task.

In step S32, CPU 111 reads a conversion table. Specifically, CPU 111 reads the conversion table associated with the application program to be executed by the task that has been specified as the current task in step S31. Here, the current task is the task of executing the first application program. Thus, CPU 111 reads first conversion table 91, associated with the first application program, from HDD 115.

In the following step S33, CPU 111 determines whether a gesture event has been detected. CPU 111 may detect a gesture event as it carries out the gesture event determining process shown in FIG. 9. If a gesture event has been detected, the process proceeds to step S34; otherwise, the process proceeds to step S36.

In step S34, CPU 111 determines whether there is a process to be standardized corresponding to the gesture event. Specifically, CPU 111 extracts, from the conversion records included in first conversion table 91 read in step S32, a conversion record in which the gesture identification information of the gesture event detected in step S33 is set in the "gesture" field. If such a conversion record has been extracted, CPU 111 determines that there is a process to be standardized corresponding to the gesture event. If there is such a process to be standardized, the process proceeds to step S35; otherwise, the process proceeds to step S37.

In the following step S35, CPU 111 outputs the process identification information of the process to be standardized, to the current task specified in step S31, and the process then proceeds to step S38. More specifically, using the process identification information set in the "process" field in the conversion record extracted in step S34 as the process identification information of the process to be standardized, CPU 111 generates an application command including the process identification information of the process to be standardized, and outputs the generated application command to the current task which executes the first application program.

The process proceeds to step S36 in the case where no gesture event has been detected. In step S36, CPU 111 determines whether one or more touch events have been detected. The touch events detected here are the touch events detected when no gesture event is detected. For example, in the case where a user inputs a tap operation, the touch event whose state is "Start" and the touch event whose state is "Exit" are detected in accordance with the user's tap operation. If one or more touch events have been detected, the process proceeds to step S37; otherwise, the process proceeds to step S38.

In step S37, CPU 111 outputs the touch event(s) detected in step S36, or a plurality of touch events constituting the gesture event detected in step S33, to the current task specified in step S31, which is here the task of executing the first application program. The process then proceeds to step S38.

In step S38, CPU 111 determines whether the current task has been finished. If the current task specified in step S31 has been finished, the process is terminated; otherwise, the process returns to step S33.

As described above, MFP 100 according to the present embodiment stores, at the stage when a first application program is installed, first conversion table 91 in which a plurality of types of processes determined by the first application program are each associated with one of a plurality of gesture events, and stores, at the stage when a second application program is installed, second conversion table 93 in which a plurality of types of processes determined by the second application program are each associated with one of a plurality of gesture events. In response to detection of one or more positions by touch panel 165, MFP 100 generates touch events each including a piece of positional information indicating the corresponding one of the one or more positions, and determines a gesture event on the basis of a set of a plurality of touch events. In the case where the current task is first application executing portion 61 which executes the first application program, MFP 100 refers to first conversion table 91 to cause the process identified by the process identification information associated with the determined gesture event to be performed. In the case where the current task is second application executing portion 63 which executes the second application program, MFP 100 refers to second conversion table 93 to cause the process identified by the process identification information associated with the determined gesture event to be performed. As such, an operation input into touch panel 165 can be associated with the process determined by the first or second application program. Therefore, the first and second application programs can be developed irrespective of the operations acceptable by touch panel 165. This facilitates development of application programs.

In the case where no process has been associated by first conversion table 91 with the gesture event determined on the basis of a set of touch events, the touch events are output to first application executing portion 61. In the case where no process has been associated by second conversion table 93 with the gesture event determined on the basis of a set of touch events, the touch events are output to second application executing portion 63. Therefore, even in the case where the first and second application programs both support the operations accepted by touch panel 165, the first and second application programs can be installed with no problems.

While MFP 100 has been described as an example of the image processing apparatus in the above embodiment, the present invention may of course be understood as an operation standardization method for causing CPU 111 controlling MFP 100 to perform the processing shown in FIGS. 9 and 10, or as an operation standardization program for causing CPU 111 to perform the operation standardization method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a display device to display an image;
a touch panel capable of detecting touching of one or more positions a user on a display surface of said display device; and
a processor configured to:
(a) control said display device and said touch panel,
(b) in response to detection of the touching of one or more positions by said touch panel, to output touch events each including positional information indicating each of said one or more positions,
(c) based on a set of a plurality of touch events continuously output, to determine one of a plurality of gesture events accepted based on a designation of a user, and
(d) in response to acceptance of said gesture event, to control said image processing apparatus to cause it to execute a process, wherein said processor is configured to:
in response to acceptance of the gesture event, control execution of a process corresponding to said accepted gesture event based on a predetermined corresponding relationship between the gesture event and the process;
accept an installation of an application program for accepting an operation different from the gesture event and executing the process;
in a case where the process executed in said application program and the process determined by said corresponding relationship are the processes of the same type, to associate the gesture event corresponding to the process determined by said corresponding relationship with the process executed in said application program,
in response to acceptance of the gesture event at the time of execution of said application program, to specify a process associated with said accepted gesture event, and
to execute said specified process.

2. The image processing apparatus according to claim 1, wherein in the case where no process corresponding to said accepted gesture event, said processor specifies one or more pieces of positional information included in the plurality of gesture events on which determination of said gesture event is based.

3. The image processing apparatus according to claim 1, wherein
said processor determines a detected state indicating the state of said touch event on the basis of a temporal change of each of the one or more positions detected by said touch panel, and
said touch event includes said detected position and said detected state.

4. The image processing apparatus according to claim 1, wherein said processor determines said gesture event on the basis of the number of touch events simultaneously output and also on the basis of changes of the detected states included in the respective touch events continuously output.

5. An operation standardization method performed by a computer controlling an image processing apparatus, said image processing apparatus comprising:
a display device to display an image;
a touch panel capable of detecting one or more positions designated by a user on a display surface of said display device, and
a processor configured to:
(a) control said display device and said touch panel,
(b) in response to detection of the touching of one or more positions by said touch panel, to output touch events each including positional information indicating each of said one or more positions,
(c) based on a set of a plurality of touch events continuously output, to determine one of a plurality of gesture events accepted based on a designation of a user, and
(d) in response to acceptance of said gesture event, to control said image processing apparatus to cause it to execute a process, wherein said method comprises:
in response to acceptance of the gesture event, controlling execution of a process corresponding to said accepted gesture event based on a predetermined corresponding relationship between the gesture event and the process;

accepting an installation of an application program for accepting an operation different from the gesture event and executing the process;

in a case where the process executed in said application program and the process determined by said corresponding relationship are the processes of the same type, associating the gesture event corresponding to the process determined by said corresponding relationship with the process executed in said application program, in response to acceptance of the gesture event at the time of execution of said application program, specifying a process associated with said accepted gesture event, and executing said specified process.

6. The operation standardization method according to claim 5, wherein in a case where no process corresponds to the accepted gesture event, said processor specifies one or more pieces of positional information included in the plurality of gesture events on which determination of said gesture event is based.

7. The operation standardization method according to claim 5, wherein said processor determines a detected state indicating the state of said touch event on the basis of a temporal change of each of the one or more positions detected by said touch panel, and said touch event includes said detected position and said detected state.

8. The operation standardization method according to claim 7, wherein said processor determines said gesture event on the basis of the number of touch events simultaneously output and also on the basis of changes of the detected states included in the respective touch events continuously output.

9. A non-transitory computer-readable recording medium encoded with an operation standardization program performed by a computer controlling an image processing apparatus, said image processing apparatus comprising:

a display device to display an image;

a touch panel capable of detecting one or more positions designated by a user on a display surface of said display device, and a processor configured to:
  (a) control said display device and said touch panel,
  (b) in response to detection of the touching of one or more positions by said touch panel, to output touch events each including positional information indicating each of said one or more positions,
  (c) based on a set of a plurality of touch events continuously output, to determine one of a plurality of gesture events accepted based on a designation of a user, and
  (d) in response to acceptance of said gesture event, to control said image processing apparatus to cause it to execute a process, wherein said method comprises:

in response to acceptance of the gesture event, controlling execution of a process corresponding to said accepted gesture event based on a predetermined corresponding relationship between the gesture event and the process;

accepting an installation of an application program for accepting an operation different from the gesture event and executing the process;

in a case where the process executed in said application program and the process determined by said corresponding relationship are the processes of the same type, associating the gesture event corresponding to the process determined by said corresponding relationship with the process executed in said application program, in response to acceptance of the gesture event at the time of execution of said application program, specifying a process associated with said accepted gesture event, and executing said specified process said image processing apparatus including
  a display portion to display an image,
  a touch panel capable of detecting one or more positions designated by a user on a display surface of said display portion, and
  an application portion operable, in the case where an application program is executed and one of a plurality of pieces of process identification information for respectively identifying a plurality of types of processes determined by said application program is input, to perform one of said plurality of types of processes that corresponds to said input process identification information, the program causing said computer to perform:

a touch event generating step of, in response to detection of one or more positions by said touch panel, outputting touch event(s) each including positional information indicating the corresponding one of said one or more positions;

a gesture event determining step of, in the case where a plurality of touch events are continuously output in said touch event generating step, determining one of a plurality of gesture events on the basis of a set of said continuously output touch events;

an association step of, at the stage when said application program is installed, associating each of said plurality of types of processes determined by said application program with one of said plurality of gesture events in correspondence with said application program;

a process specifying step of specifying one of said plurality of types of processes that is associated in said association step, in correspondence with said application program, with the gesture event determined in said gesture event determining step; and an operation notification step of outputting the process identification information of said specified process to said application portion.

10. The non-transitory computer-readable recording medium encoded with the operation standardization program according to claim 9, wherein in a case where no process corresponds to the accepted gesture event, said processor specifies one or more pieces of positional information included in the plurality of gesture events on which determination of said gesture event is based.

11. The non-transitory computer-readable recording medium encoded with the operation standardization program according to claim 9, wherein said processor determines a detected state indicating the state of said touch event on the basis of a temporal change of each of the one or more positions detected by said touch panel, and said touch event includes said detected position and said detected state.

12. The non-transitory computer-readable recording medium encoded with the operation standardization program according to claim 11, wherein said processor determines said gesture event on the basis of the number of touch events simultaneously output and also on the basis of changes of the detected states included in the respective touch events continuously output.

\* \* \* \* \*